United States Patent [19]

Crain

[11] Patent Number: 5,425,222
[45] Date of Patent: Jun. 20, 1995

[54] UNDERWATER WEED CUTTING APPARATUS

[76] Inventor: Willard L. Crain, 1615 Kaufmann Ave., Sheboygan, Wis. 53081

[21] Appl. No.: 271,303

[22] Filed: Jul. 6, 1994

[51] Int. Cl.6 .................................. A01D 44/00
[52] U.S. Cl. ................................................ 56/8
[58] Field of Search .......................... 56/8, 9, 16.7

[56] References Cited

U.S. PATENT DOCUMENTS 3,286,447  11/1966  Grinwald ............................. 56/9

FOREIGN PATENT DOCUMENTS 899079  5/1972  Canada ............................. 56/8
594802  9/1925  France ............................. 56/8

*Primary Examiner*—Michael Powell Buiz
*Attorney, Agent, or Firm*—Wheeler & Kromholz

[57] ABSTRACT

A weed cutter for cutting weeds and other vegetation from the floor of a body of water. The underwater weed cutter includes a generally closed housing having at a front opening in the housing behind which the cutting mechanism is located. The weeds and other vegetation to be cut enter the opening wherein they are exposed to a plurality of cutting blades, each cutting blade being rotatably attached to one of two cutting mechanisms. The cutting mechanisms are driven by an electric motor which is coupled to a plurality of sprockets forming a gear box. The cutting mechanisms are routed from the rear of the housing toward to the front near the centerline where they turn approximately 90 degrees in opposite directions and proceed parallel to the opening as the cutting blades attached thereto perform the cutting operation. Ingested weed and vegetation clippings and other debris are discharged from the housing at a rear opening. A pair of rollers is rotatably attached to the bottom of the housing and a handle extends from the housing above the surface of the body of water whereby the operator can push the underwater weed cutter along the floor of the body of water. A submergible electric motor drives the cutting mechanism and is powered by a rechargeable submergible battery. A deadman switch is also provided so that the underwater weed cutter will only operate when the operator engages two levers located at the top of the handle.

8 Claims, 5 Drawing Sheets

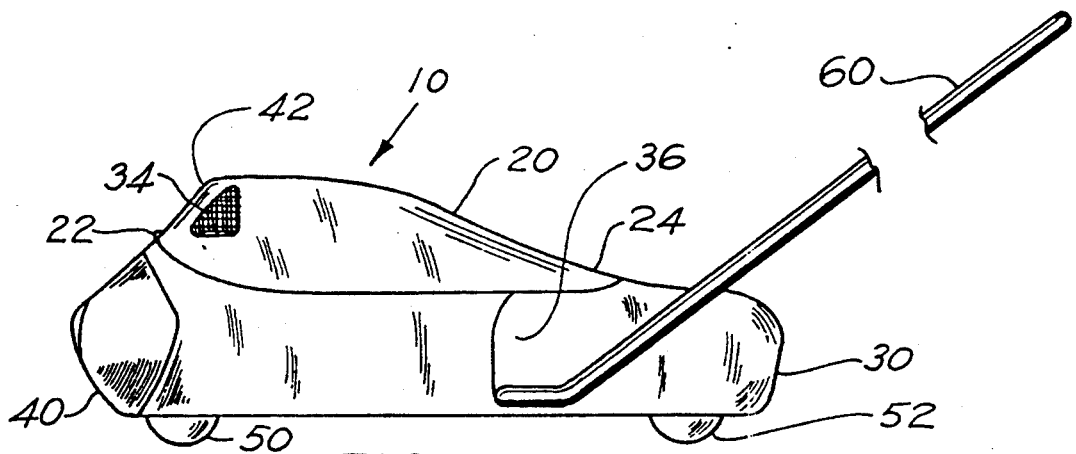
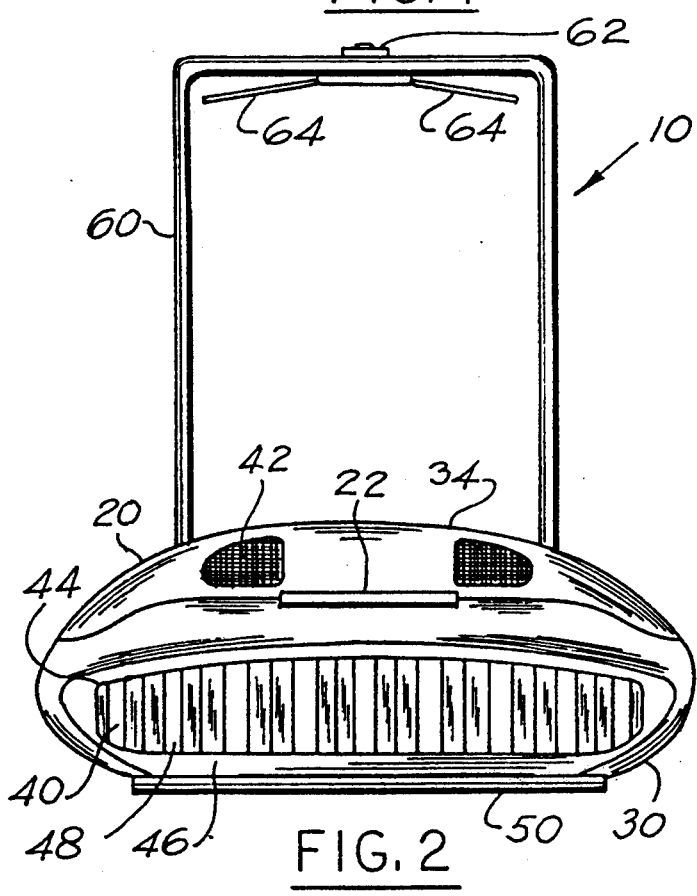

UNDERWATER WEED CUTTING APPARATUS

BACKGROUND OF THE INVENTION

Weeds and other vegetation often grow in shallow water near the shore of a lake, river, or other body of water. It is often desirable to cut these plants at the floor of the body of water as they hinder water movement and can obstruct recreational activities such as swimming and boating.

Water weeds can be manually pulled or manually cut beneath the water's surface with a sharp cutting tool. Both of these processes are very laborious and time consuming. My invention, an underwater weed cutter, has a novel cutting mechanism enclosed within a novel housing and provides an efficient, safe, and easy method of underwater weed removal.

Other underwater weed cutters are known to exist, but none have the novel features of my invention. For example, the cutters disclosed in U.S. Pat. No. 1,344,626 (Ellis), French Patent No. 2,575,360, U.S. Pat. No. 2,635,406 (Chauvin), U.S. Pat. No. 2,677,926 (Washbourne et al.), and U.S. Pat. No. 4,196,566 (Donnelley) all utilize disc-shaped cutters. U.S. Pat. No. 1,392,900 (Ambrose) discloses an unpowered cutter utilizing discs and having no housing. British Patent No. 1,589,365 (Body) discloses a cutting device having cutters projecting slightly from a housing, but the housing is scoop designed to retain the cut matter. The cutters, instead of rotating in opposite directions from a centerline, change rotation from each cutter to the next.

One of the objects of my invention is to provide an underwater weed cutter that can be pushed or propelled along the bottom of a lake or other body of water or submerged in an area to cut weeds. Another object is to provide a novel cutting mechanism whereby two (2) sets of V-shaped blades which form links of a chain enter a cutting region at a centerline and then move in opposite directions toward the sides of the underwater weed cutter while cutting. The invention includes a generally closed housing having a front opening where the underwater weeds enter and are cut by the blades and a rear opening where the cut weeds are discharged. Still another object is to provide an underwater weed cutter that is light weight, easy to transport, has a self-contained power source, and is safe to operate.

SUMMARY OF THE INVENTION

The invention comprises an underwater weed cutter used for cutting weeds and other vegetation from a body of water or other submerged area. Underwater weeds and other vegetation are cut along a horizontal plane parallel to the bottom or floor of the body of water. The cutting mechanism and power source of my invention are contained within a generally closed housing having an opening at a front portion. The housing has a handle attached to it and is designed to be pushed or propelled along the bottom of the body of water. A grill having small rectangular openings formed by "V" shaped members is located within the front opening. Weeds and other vegetation enter through these openings behind which the novel cutting mechanism of my invention is located. The cutting mechanism includes two roller chains to which a plurality of cutting blades having cutting edges are attached. A blade is attached between each link of the chain. A plurality of sprockets comprise a gear box and are arranged such that each chain having cutting blades attached runs from the rear center of the housing toward the housing front parallel to the centerline of the housing. At the front of the housing, each chain having cutting blades attached turns approximately 90 degrees in an opposite direction. At this point, each cutting blade enters the cutting region directly behind the grill. The cutting blades move from the centerline in opposite directions toward the sides of the housing as their cutting edges cut the weeds and vegetation that has entered the fronts opening through the grill. The projecting blade tips move in a direction away from the centerline of the housing tending to sweep the weeds to the side as they are cut and tending to create a current of water which also helps to sweep the weeds to the side of the housing cavity. This arrangement of components helps control water flow and prevents the underwater weed cutter from jamming with cut weeds.

The cutting mechanism is driven by a sealed electric motor. Power for the motor is provided by a sealed and rechargeable battery. These components are mounted on the chassis of the housing in such a way as to assist in providing proper balance. A deadman's switch on the handle turns off the power whenever the operator releases the handle.

A pair of rollers extend through the bottom of the housing through rectangular openings. Roller housings extend upward through the housing floor and into the cavity of the housing. The rollers support the underwater weed cutter on the floor of the body of water. The front roller is approximately twice as long as the rear roller.

A plurality of ports are provided on the housing to allow water to enter and exit the housing cavity freely. Thus as the underwater weed cutter is pushed along the floor of the body of water, minimum resistance is encountered as water flows through my invention and is not required to flow around it. The ports located near the front of the housing have screens to prevent uncut material from entering the housing cavity. The ports on the sides and rear of the housing do not have screens so that cut matter can be easily and efficiently discharged from the underwater weed cutter.

My underwater weed cutter is placed into a body of water having weeds or other vegetation to be cut. As it is lowered into the water, it fills with water which acts to sink the housing to the floor of the body of water. After the power switch has been turned "on" and the operator engages the deadman switches, the cutting assembly of my invention is energized. The operator then pushes the underwater weed cutter across the floor of the body of water in a manner similar to a lawn mover. Front and rear rollers freely rotate on the floor of the body of water. As my underwater weed cutter is pushed along, the stems of weeds and other vegetation to be cut enter the openings in the grill. The stems are cut by the cutting blades.

Part of the weed enters the housing but most of the cut weed simply floats to the surface of the body of water. Larger objects which do not fit between the "V" shaped members, such as rocks and wood, are prevented from entering and damaging the cutting mechanism. The two sets of roller chains with cutting blades enter the cutting region near the centerline of the housing and are then directed toward the sides of the housing. As the cutting blades move along the front of the housing in opposite directions, they cut weeds and other vegetation encountered.

Cut weeds and vegetation pass behind the cutting region and into the interior cavity of the housing. The cut weeds and vegetation are discharged from the cavity at the discharge openings located at the rear of the housing.

When finished cutting, the deadman switches are released, the power is switched "off", and my underwater weed cutter is simply removed from the body of water. Water located within the cavity of the housing drains from openings in the bottom of the housing when the unit is removed.

DESCRIPTION OF THE DRAWINGS

FIG. 1 is a side view of the underwater weed cutter of the present invention.

FIG. 2 is a front view of the underwater weed cutter of the present invention.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

The present invention comprises an apparatus for cutting weeds and other plants on the floor of a body of water and is shown generally at 10.

Figure 3:
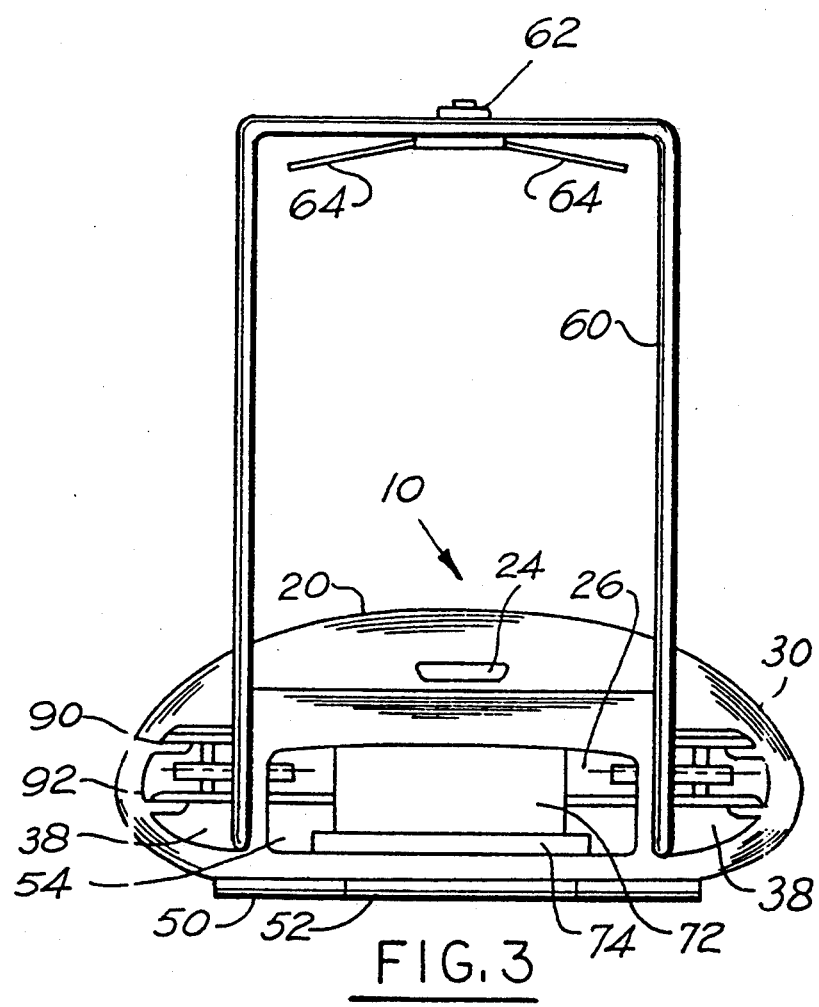
FIG. 3 is a rear view of the underwater weed cutter of the present invention.

Referring to FIGS. 1-3, the underwater weed cutter 10 includes a top housing unit 20, a bottom housing unit 30, a grill 40, a front roller 50, a rear roller 52, and a handle 60. Located on handle 60, as shown in FIGS. 2 and 3, are a power switch 62 and a pair of engaging levers 64. Top housing unit 20 is connected to bottom housing unit 30 by means of a hinge 22 located near the front of the invention 10 and snap latch 24 located near the rear side. The hinge 22 is best shown in FIG. 2 and the snap latch 24 is best shown in FIG. 3. Top housing unit 20 and bottom housing unit 30 can be fabricated from any suitable material; however, due to the aquatic application molded plastic is preferred. Similarly the hinge 22 and snap latch 24 are preferably fabricated from plastic.

Also shown in FIG. 1-3, a plurality of port holes 34, 36, and 38 are provided for the inlet and outlet of water during operation of my underwater weed cutter. With the exception of the sealed electric motor 70, none of the mechanical components discussed in detail below are lubricated with petroleum products. All moving parts rely on Teflon coatings and/or water for their lubrication. Port holes 34 are located on the front side of top housing unit 20, port holes 36 are located on the sides of the bottom housing unit 30, and port holes 38 are located at the rear of bottom housing unit 30. The front port holes 34 are covered by screens 42 to prevent debris from entering inner cavity 26 of my invention 10. A large rear opening 54, as shown in FIG. 3, is also provided to allow for discharge of water as well as cut matter.

Figure 6:
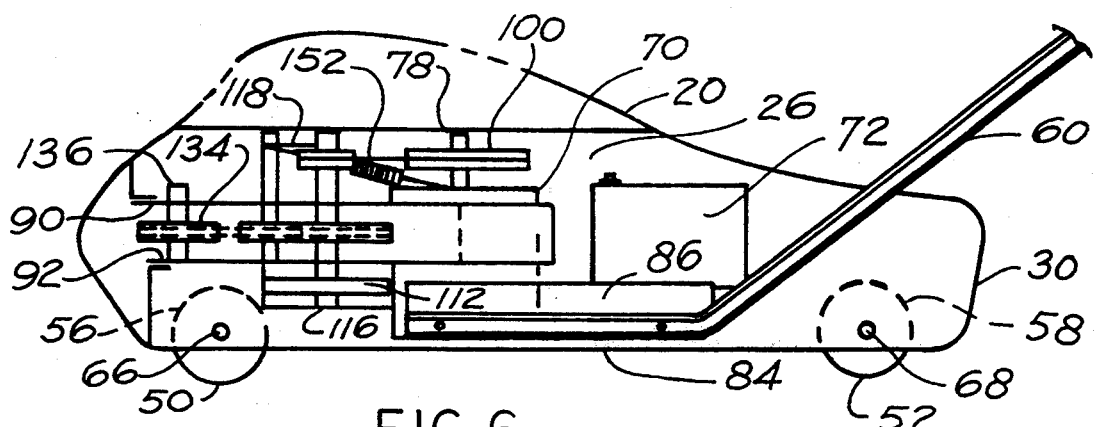
FIG. 6 is a partially cutaway side view of the underwater weed cutter of the present invention.

Handle 60 is connected to bottom housing unit 30 at handle attachment brackets 28 as shown in FIG. 6. Front roller 50 protrudes through a rectangular opening of front roller housing 56 in the bottom housing unit 30. Similarly, rear roller 52 protrudes through a second rectangular opening of rear roller housing 58 in bottom housing unit 30. Front roller 50 is twice as long as rear roller 52. Both rollers 50 and 52 have a diameter of 3 inches and are made from PVC plastic filled with styrofoam for buoyancy. Front roller 50 and rear roller 52 rotate on axles 66 and 68 respectively. The ends of axles 66 and 68 are rotatably attached to the sides of the bottom housing unit 30 at the outer edges of roller housings 56 and 58.

Bottom housing unit 30 has a large front opening 44 as shown in FIG. 2. Grill 40 is located within opening 44. As also shown in FIG. 2, grill 40 has a plurality of V-shaped members 46 extending from the top of opening 44 to the bottom of opening 44 and forming opening or slots 48 through which weeds and other matter enter before being cut in the cutting region. The slots 48 are approximately one inch wide. These slots or openings 48 permit the entrance of water weeds and vegetation while prohibiting the entrance of larger objects that may damage or jam cutting blades 182. The width of the opening 44 can be reduced or expanded to various sizes. The present cutting plane is $25\frac{1}{2}$ inches wide, however this can be changed to suit any application.

Figure 4:
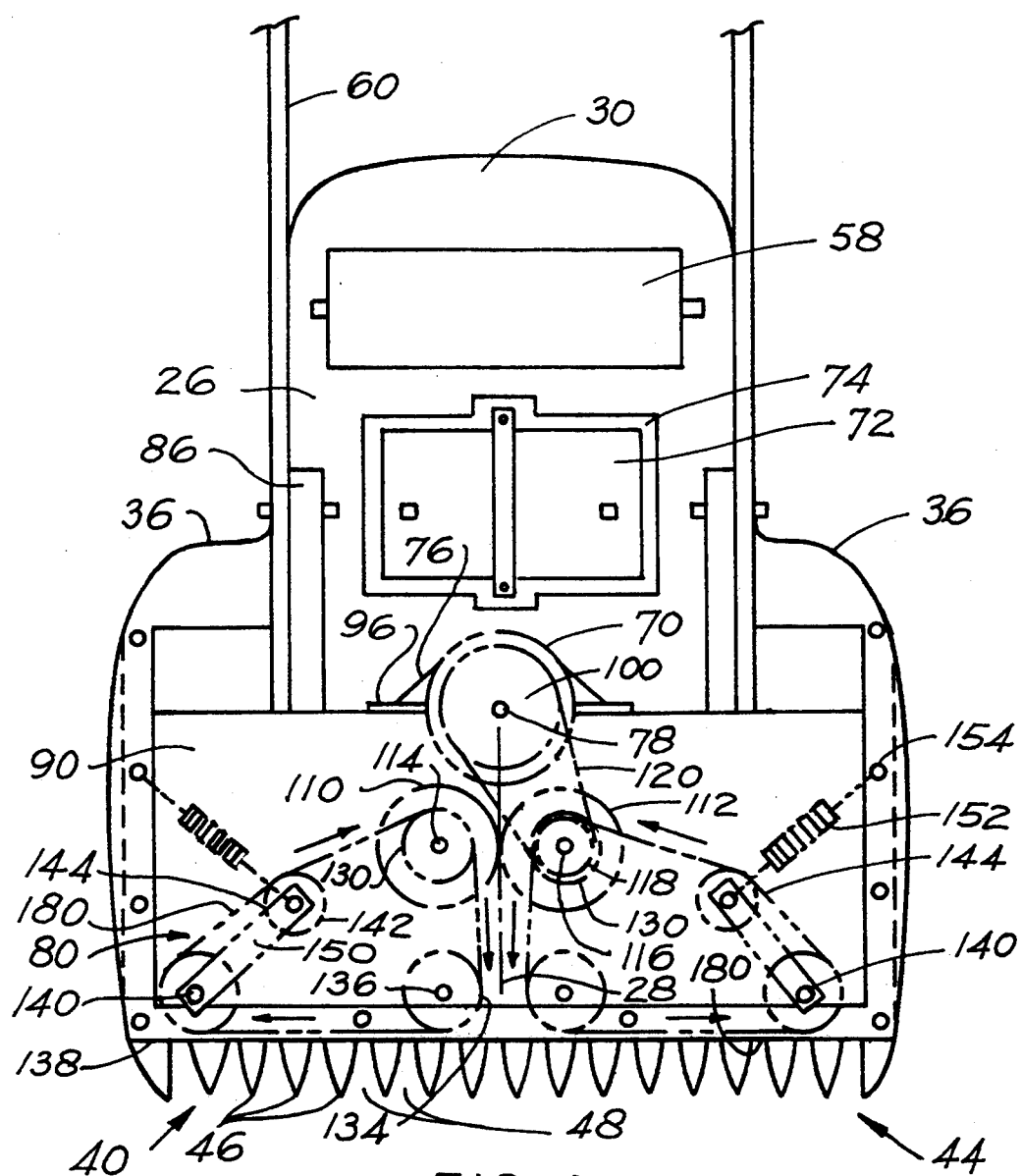
FIG. 4 is a partially cutaway top view of the underwater weed cutter of the present invention.
Figure 5:
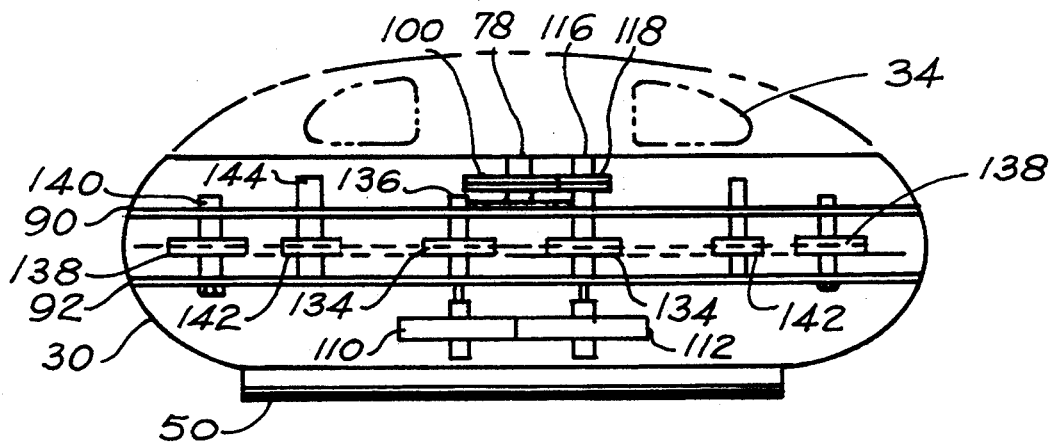
FIG. 5 is a partially cutaway front view of the underwater weed cutter of the present invention.
Figure 7:
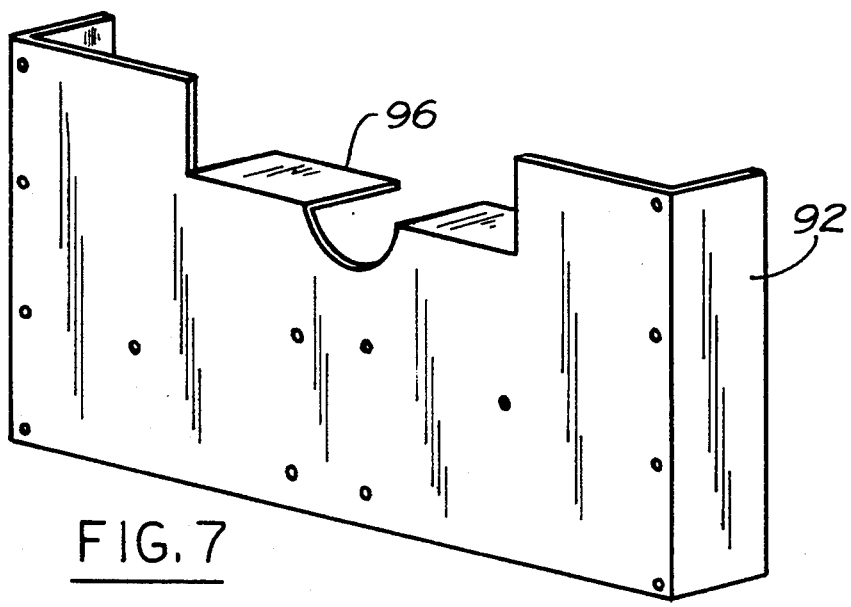
FIG. 7 is a perspective view of the lower assembly plate of the underwater weed cutter.
Figure 8:
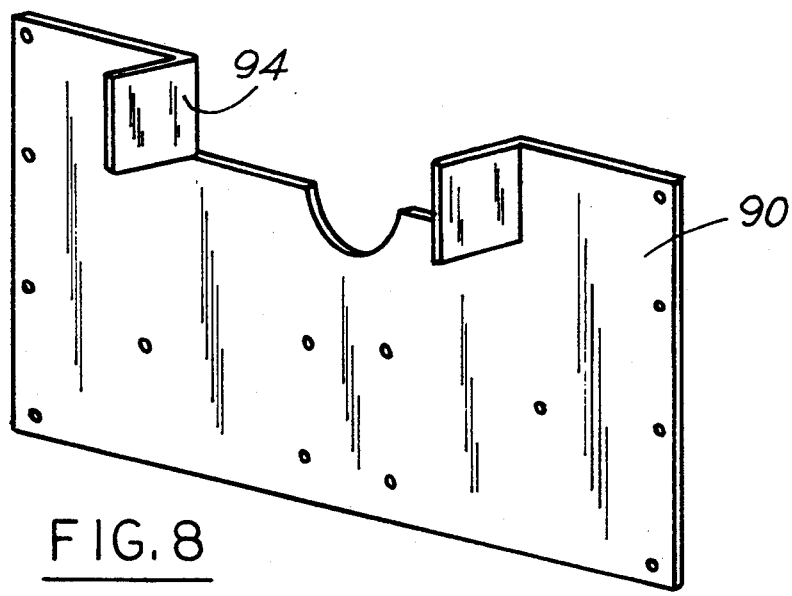
FIG. 8 is a perspective view of the upper assembly plate of the underwater weed cutter.

Cutting mechanism 80 is shown in FIGS. 4, 5, and 6. Submergible electric motor 70 is powered by a sealed rechargeable NiCad battery 72. A one-third ($\frac{1}{3}$) horsepower or greater submersible electric motor 70 is preferred. The battery, preferably a 125 amp hour NiCad battery, 72 is mounted to a support plate 74 which is in turn mounted to bottom housing unit 30 as shown in FIG. 4. Both motor 70 and battery 72 are positioned to provide proper balance for my underwater weed cutter 10. Motor 70 is mounted to a mounting bracket 76 which is in turn mounted to bottom housing unit 30 and to upper assembly plate 90 and lower assembly plate 92 at upper assembly plate back flap 94 and lower assembly plate back flap 96. These plates 90 and 92 are shown in FIGS. 8 and 7 respectively. A four inch diameter aluminum motor drive pulley 100 is mounted to output shaft 78 of motor 70.

The cutting assembly 80 is located between upper assembly plate 90 and lower assembly plate 92 as shown in FIGS. 5 and 6. Two 5 inch diameter half inch wide nylon spur gears 110 and 112 are mounted below lower assembly plate 92 in gear meshing relationship on half inch aluminum shafts 114 and 116 respectively.

A second 2 inch diameter aluminum pulley 118 is mounted to the top of shaft 116. A $\frac{3}{8}$ inch shingle roundthane belt 120 installed between pulley 118 and motor drive pulley 100 drives shaft 116 when motor 70 is energized. Spur gear 112 drives spur gear 110. It should be noted that spur gears 112 and 110 and that shafts 114 and 116 rotate in opposite directions.

Cutting assembly 80 includes two cutting mechanisms 82. The mechanism 82 are identical except for their direction of rotation. Each mechanism 82 includes a drive sprocket 130, a central sprocket 134, an outer sprocket 138, and a tension sprocket 142. With the exception of the tension sprockets 142, the drive sprockets 130, central sprockets 134, and outer sprockets 138 are 2½ inch diameter nickel plated steel or nylon sprockets. Each sprocket has 15 teeth. Tension sprockets 142 are 2 inch diameter sprockets manufactured from the same material.

One drive sprocket 130 is mounted at the top of ½ diameter aluminum shaft 114 and the other is mounted at the top of ½ inch diameter aluminum shaft 116. Central sprockets 134 are mounted on similar shafts 136, outer sprockets 138 are mounted on shafts 140, and tension sprockets 142 are mounted on shafts 144. Tension bars 150 are pivotally connected to shafts 140 and extend to shafts 144 where tension sprockets 142 are mounted. Tension springs 152 are attached to the top of shaft 144 and extend to an outer edge 154 of upper assembly plate 90 as shown in FIG. 4.

Figure 10:
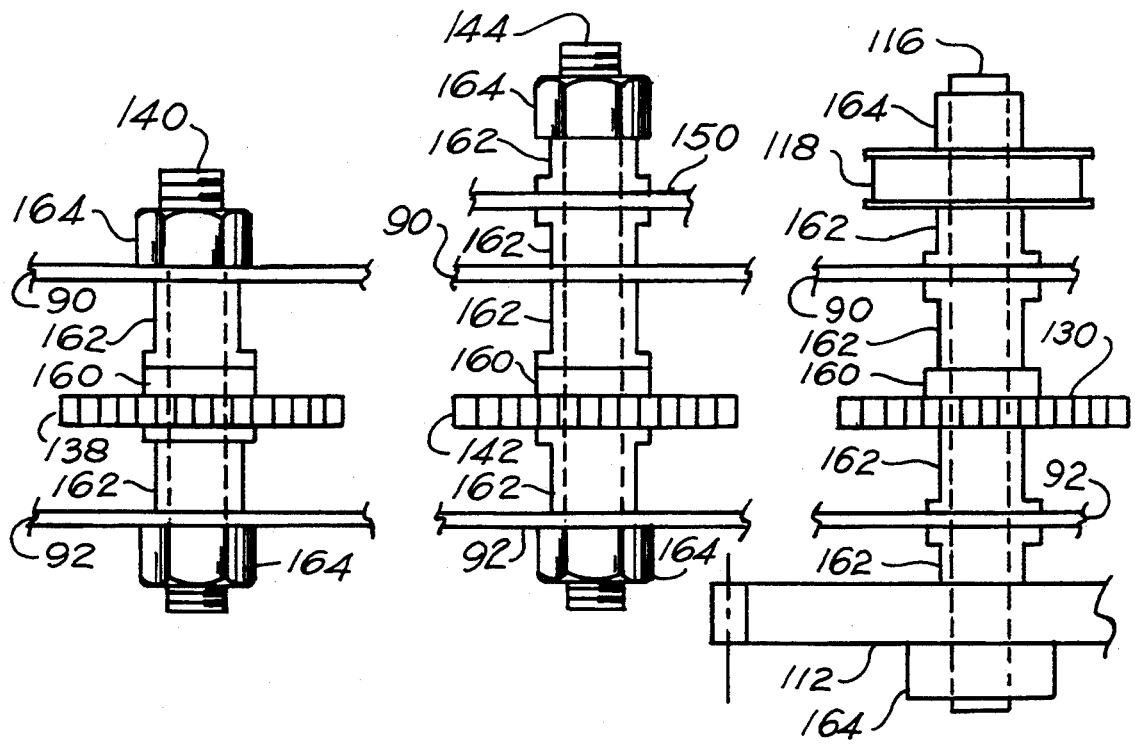
FIG. 10 is a partially cutaway exploded side view of a portion of the cutting assembly mechanism of the underwater weed cutter.

Referring to FIG. 10, sprockets 130, 134, 138, and 142, shafts 116, 136, 140, 144, and spur gear 112 are shown in detail. Each sprocket 130, 134, 138, and 142 is mounted between sleeve type linear bearings 162 having a Teflon coating. The bearings 162 also function as spacers between the upper and lower assembly plates 90 and 92. They range in height from one half to three quarters of an inch. The bearings 162 reduce friction between rotating components and eliminate the need for petroleum based lubrication. The sprocket 130 on the rotating shaft 116 has a set screw at 160 to anchor the sprocket 130 to the rotating shaft 116. A plurality of nuts 164 hold shafts 114, 116, 136, 140, and 144 between upper and lower assembly plates 90 and 92.

Figure 9:
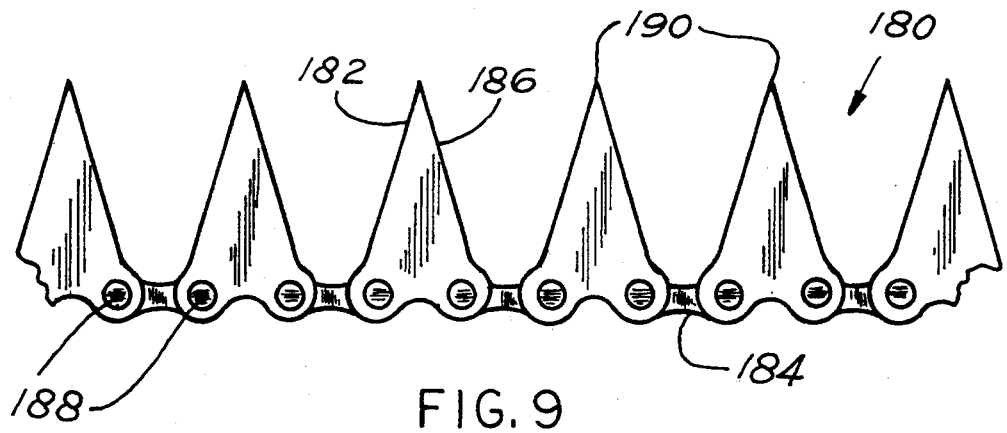
FIG. 9 is a top view of the roller chain with cutting blades of the underwater weed cutter.

Two sets of ½ inch pitch ¼ inch wide nickel plated roller chains 180 with cutting blades 182, as shown in detail in FIG. 9, perform the cutting function of my invention 10. V-shaped cutting blades 182 are attached as links between chain links 184 and are held in place by chain link pins 188. Each V-shaped blade 182 has at least one sharp cutting edge 186. The points 190 of cutting blades 182 are spaced at one inch intervals. To prevent interference, the cutting blades 182 are mounted to the top side of the links 184 on one chain 180 and on the bottom side of the links 184 on the other chain 180.

As best shown in FIG. 4, each roller chain 180 with cutting blades 182 is engaged with sprockets 130, 134, 138, and 142 in each cutting mechanism 82. Tension sprocket 142 keeps each roller chain 180 taught as tension springs 152 take up extra slack in the chains 180.

My underwater weed cutter 10 works as follows. It is placed into a body of water having weeds or other vegetation to be cut. As the housing 30 is lowered into the water, it fills with water which acts to sink the invention 10 to the floor of the body of water and lubricate all moving parts with the exception of sealed motor 70. The operator turns power switch 62 to the "on" position and then pulls both engaging levers 64 toward handle 60 in order to energize the cutting assembly 80. Both engaging levers 64 must be pulled toward handle 60 for cutting assembly 80 to start. The operator then pushes my invention 10 across the floor of the body of water in a manner similar to a lawn mower. Front and rear rollers 50 and 52 rotate on their axles 66 and 68 respectively as the housing moves along the floor of the body of water and allow the underwater weed cutter 10 to roll smoothly along the floor. As my underwater weed cutter 10 is pushed along, the stems of weeds and other vegetation to be cut enter between the V-shaped members 46 at openings 48 in grill 40. The two sets of roller chains 180 with cutting blades 182 rotate in the direction shown by the arrows in FIG. 4. Each chain 180 with cutting blades 182 proceeds forward parallel to the centerline 28 in the central region of my underwater weed cutter 10 toward the front opening 44 of the cutter 10. As each chain 180 engages with a central sprocket 134, it turns approximately 90 degrees and is directed toward outer sprocket 138 at the side of the underwater weed cutter 10. As each chain makes this turn, its cutting blades 182 first encounter weeds or vegetation to be cut as they enter the cutting region. Each respective chain 180 with cutting blades 182 moves toward opposite sides of the invention 10 and continues to cut weeds. Each chain 180 then engages outer sprocket 138, tension sprocket 142, and drive sprocket 130. Between drive sprocket 130 and central sprocket 134, the cutting blades 182 are in overlapping relationship. However, they do not interfere with one another as one set of blades 182 is mounted on the top of chain links 184 and the other set 182 is mounted on the bottom of chain links 184. Thus, the cutting blades 182 pass one on top of the other before they pass into the opening 44 to begin the cutting process again.

A portion of the cut weeds and vegetation pass behind the cutting region and further into the interior cavity 26 of my underwater weed cutter 10 defined by top housing unit 20 and bottom housing unit 30. However, most of the cut weed or vegetation matter simply floats to the surface of the body of water. Ingested cut weed and vegetation clippings are discharged from my invention 10 at the discharge opening 54 located at the rear side of bottom housing unit 30 and pass back into the body of water.

Front port holes 34 allow for water to enter cavity 26 and reduce water resistance encountered when the operator propels underwater weed cutter 10 forward. Port holes 34 also ensure that an air pocket is not formed in top housing unit 20 when underwater weed cutter 10 is submerged. An air pocket within cavity 26 may not allow underwater weed cutter 10 to sink to the floor of the body of water and may prevent adequate lubrication of all moving components.

When finished cutting, engaging levers 64 are released, power switch 62 is switched to the "off" position, and underwater weed cutter 10 is simply removed from the water. Water located within cavity 26 drains from rectangular openings 84 which extend through bottom housing unit 30. It may be necessary to recharge rechargeable battery 72 before the next use.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. An apparatus for cutting weeds in a body of water, the apparatus comprising:
   a housing having a front opening and a centerline;
   at least two rollers attached to the housing;

a pair of cutting mechanisms having a plurality of cutting blades connected thereto located within the housing;

each cutting mechanism with cutting blades entering the front opening near the centerline and turning in opposite directions perpendicular to the centerline;

a drive mechanism, located within the housing, driving the cutting mechanisms;

the drive mechanism connected to the cutting mechanisms by at least one sprocket;

a propelling means, attached to the housing, for propelling the apparatus.

2. The apparatus of claim 1 wherein the propelling means is a handle bar.

3. The apparatus of claim 2 wherein the drive mechanism comprises:

a pair of central pulleys, rotatably attached to the housing near the centerline of the housing at the front opening;

a pair of outer pulleys, each rotatably attached near an outer end of the front opening;

a pair of tensioning pulleys rotatably attached within the housing;

and a pair of drive pulleys for driving the cutting mechanisms rotatably attached within the housing.

4. The apparatus of claim 3 wherein the drive pulleys are coupled to and driven by a sealed electric motor within the housing.

5. The apparatus of claim 1 wherein the housing includes a plurality of port holes for the induction of water and the discharge of water and cut weeds.

6. The apparatus of claim 1 wherein the cutting blades are V-shaped and each has at least one cutting edge.

7. An apparatus for cutting weeds from a floor of a body of water, the apparatus comprising:

a generally closed housing having an opening at a front portion of the housing and a centerline perpendicular to the opening;

two cutting chains, each chain having a set of cutting blades pivotally attached;

each set of blades rotating about a drive mechanism into the opening near the centerline and then in opposite directions perpendicular to the centerline.

8. An apparatus for cutting vegetation on the floor of a body of water, the apparatus comprising:

a generally closed housing having a front opening;

a plurality of cutting blades having cutting edges;

a pair of rollers rotatably attached to a bottom side of the housing;

a handle bar attached to the housing and extending above the body of water;

a motor mounted within the housing;

the motor coupled to a gear box located within the housing;

the gear box driving the plurality of cutting blades into the front opening near the centerline and in opposite directions from the centerline along a horizontal cutting plane.

* * * * *